(12) United States Patent
Echle et al.

(10) Patent No.: US 12,062,944 B2
(45) Date of Patent: Aug. 13, 2024

(54) AXIAL FLUX MACHINE FOR AN ELECTRICAL PROCESSING DEVICE AND ELECTRICAL PROCESSING DEVICE WITH AN AXIAL FLUX MACHINE

(71) Applicant: Robert Bosch GmbH, Stuttgart (DE)

(72) Inventors: Andreas Echle, Neipperg (DE); Nejila Parspour, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/754,576

(22) PCT Filed: Oct. 21, 2020

(86) PCT No.: PCT/EP2020/079615
§ 371 (c)(1),
(2) Date: Apr. 6, 2022

(87) PCT Pub. No.: WO2021/083760
PCT Pub. Date: May 6, 2021

(65) Prior Publication Data
US 2024/0063668 A1 Feb. 22, 2024

(30) Foreign Application Priority Data
Oct. 31, 2019 (DE) .................. 10 2019 216 844.2

(51) Int. Cl.
*H02K 1/18* (2006.01)
*H02K 1/02* (2006.01)
(Continued)

(52) U.S. Cl.
CPC ............. *H02K 1/182* (2013.01); *H02K 1/02* (2013.01); *H02K 1/165* (2013.01); *H02K 7/14* (2013.01)

(58) Field of Classification Search
CPC ............ H02K 1/02; H02K 1/16; H02K 1/165; H02K 1/182; H02K 7/14
(Continued)

(56) References Cited

U.S. PATENT DOCUMENTS 11,139,707 B2 * 10/2021 Klassen ............... F16C 19/545
2010/0295389 A1 * 11/2010 Tessier ................ H02K 19/103
310/46

(Continued)

FOREIGN PATENT DOCUMENTS

AT           520633 A4    6/2019
DE   10 2016 204 444 A1  9/2016
(Continued)

OTHER PUBLICATIONS

International Search Report corresponding to International Patent Application No. PCT/EP2020/079615, mailed Feb. 1, 2021 (German and English language document (5 pages).

*Primary Examiner* — Rashad H Johnson
(74) *Attorney, Agent, or Firm* — Maginot, Moore & Beck LLP

(57) ABSTRACT

An axial flux machine, in particular a single-sided axial flux motor, for an electrical machining device includes a machine shaft, in particular a motor shaft, a disc-shaped stator, and a disc-shaped rotor which is adjacent to the stator in the axial direction of the machine shaft. The stator is designed as a winding carrier for at least one stator winding and the rotor, which is connected fixedly in terms of rotation to the machine shaft, is capable of being set in a rotary movement relative to the stator. Additionally, the stator of the axial flux machine includes a combination of composite materials, in particular fiber-plastic composites, and soft magnetic iron. The axial flux machine can be arranged in an electrical processing device.

14 Claims, 10 Drawing Sheets

(51) Int. Cl.
*H02K 1/16* (2006.01)
*H02K 7/14* (2006.01)

(58) Field of Classification Search
USPC .......................................................... 310/50
See application file for complete search history.

(56) References Cited

U.S. PATENT DOCUMENTS

| | | | |
|---|---|---|---|
| 2013/0187488 A1* | 7/2013 | Sakamoto | H02K 1/06 |
| | | | 310/44 |
| 2014/0009022 A1 | 1/2014 | Kim | |
| 2014/0103767 A1* | 4/2014 | Nadeau | H02K 1/30 |
| | | | 310/156.02 |
| 2014/0191624 A1* | 7/2014 | Jahshan | H02K 11/33 |
| | | | 310/68 B |
| 2015/0091405 A1* | 4/2015 | Sakamoto | H02K 1/06 |
| | | | 310/156.37 |
| 2017/0047821 A1* | 2/2017 | Klassen | H02K 1/2783 |
| 2018/0219459 A1* | 8/2018 | Chahine | H02K 11/33 |
| 2019/0386549 A1* | 12/2019 | Prieto | H02K 1/2798 |
| 2020/0028393 A1* | 1/2020 | Ravaud | H02K 1/04 |
| 2020/0227991 A1* | 7/2020 | Boettcher | H02K 3/28 |
| 2020/0295610 A1* | 9/2020 | To | H02K 1/2795 |
| 2020/0373797 A1* | 11/2020 | Culleton, III | H02K 1/2713 |
| 2021/0143700 A1* | 5/2021 | Yao | H02K 21/24 |
| 2021/0152040 A1* | 5/2021 | Yao | H02K 1/14 |
| 2021/0211007 A1* | 7/2021 | Simizu | H02K 3/12 |
| 2021/0265889 A1* | 8/2021 | Frampton | H02K 3/26 |
| 2021/0313851 A1* | 10/2021 | Zhou | H02K 1/145 |
| 2022/0085701 A1* | 3/2022 | Versavel | H02K 21/24 |
| 2022/0263393 A1* | 8/2022 | Takahashi | H02K 1/276 |
| 2022/0368190 A1* | 11/2022 | Laber | H02K 1/2793 |
| 2022/0416622 A1* | 12/2022 | Echle | H02K 1/2793 |
| 2023/0032576 A1* | 2/2023 | Lampérth | H02K 1/27 |
| 2023/0036536 A1* | 2/2023 | Milheim | H05K 1/0373 |
| 2023/0216357 A1* | 7/2023 | Hans | H02K 1/146 |
| | | | 310/156.32 |
| 2023/0412024 A1* | 12/2023 | Riess | H02K 21/24 |

FOREIGN PATENT DOCUMENTS

| | | |
|---|---|---|
| DE | 10 2015 223 766 A1 | 6/2017 |
| EP | 2 523 311 B1 | 11/2017 |
| EP | B 331 140 A1 | 6/2018 |
| WO | 2018/100208 A1 | 6/2018 |

* cited by examiner

AXIAL FLUX MACHINE FOR AN ELECTRICAL PROCESSING DEVICE AND ELECTRICAL PROCESSING DEVICE WITH AN AXIAL FLUX MACHINE

This application is a 35 U.S.C. § 371 National Stage Application of PCT/EP2020/079615, filed on Oct. 21, 2020, which claims the benefit of priority to Serial No. DE 10 2019 216 844.2, filed on Oct. 31, 2019 in Germany, the disclosures of which are incorporated herein by reference in their entirety.

The disclosure relates to an axial flux machine, in particular a single-sided axial flux motor, for an electric machining device, and to an electric machining device having an axial flux machine.

BACKGROUND

Axial flux machines have the advantage, compared with conventional electric machines with a radial flux direction, of being very efficient and having a much shorter overall length. In addition, with the same outside diameter, a greater torque density or power density can be achieved. These improvements are attributable, inter alia, to a greater air gap area with a comparable construction volume. Thanks to a lower iron volume of the rotating components, greater efficiency over a greater range of speeds also arises.

The structure of a stator of an axial flux machine is relatively complicated on account of the required magnetic 3D flux guidance. The slots in the lamination stack generally need to be punched out before the process of winding the stator winding. In addition, the individual laminations give rise to drawbacks in that the pole shoes achieve only a tangential overhang and that the stator teeth with the salient pole shoes cannot be externally wound, resulting in a low filling factor of the stator winding and correspondingly reduced efficiency.

DE 10 2015 223 766 A1 discloses an axial flux machine having bent and wound lamination stacks as winding carrier. The stator of the axial flux machine has a sintered carrier structure made of soft-magnetic material and an insert in the form of a lamination stack. The insert is attached to the carrier structure via a form- and/or force-fit and at least partially forms a pole shoe of the axial flux machine. The lamination stack is formed by means of individual layers, stacked on top of one another, of individual laminations, which consist of a soft iron. The individual laminations are attached to one another so as to be electrically insulated from the respectively adjacent lamination.

Alternatively, stators of axial flux machines are also constructed purely from composite materials (soft magnetic composites—SMC). SMC materials consist of high-purity iron powder with a special surface coating on each individual particle. This electrically insulating surface ensures high electrical resistance even after pressing and the heat treatment, this in turn having the effect that eddy-current losses are minimized or avoided. SMC materials are known to those skilled in the art, and so their composition will not be discussed further here. Stators made of composite materials are particularly brittle and sensitive to shock, however, and have reduced permeability compared with soft-magnetic laminations. For the use of an axial flux machine, in particular of an axial flux motor, in an electric machining device, in particular in an electric power tool, a high level of insensitivity to vibration and impacts is particularly important, however. On the other hand, it is not possible to dispense with the use of composite materials on account of the requisite torque density of the axial flux machine.

Therefore, it is an object of the disclosure to provide a structure, which is particularly insensitive to shock compared with the prior art, of a stator for an axial flux machine in conjunction with a high torque density of the axial flux machine.

SUMMARY

The disclosure relates to an axial flux machine, in particular a single-sided axial flux motor, for an electric machining device, having a machine shaft, in particular a motor shaft, a disk-like stator and a disk-like rotor arranged next to the stator in an axial direction of the machine shaft, wherein the stator is in the form of a winding carrier for at least one stator winding, and the rotor, connected to the machine shaft for conjoint rotation, is able to be set in rotational movement relative to the stator.

To achieve the stated object, it is provided that the stator consists of a combination of composite materials, in particular of fiber-plastic composites, and soft-magnetic iron. Particularly advantageously compared with axial flux machines of the prior art, an axial flux machine that is extremely resistant to mechanical loads and at the same time very powerful and efficient, or a high-torque axial flux motor, can thus be provided. This allows it to be used in electric machining devices, which not only need to be very robust with respect to shocks and vibrations but also need to provide a very high electromechanical performance over a relatively long service life. Therefore, the disclosure also relates to an electric machining device, in particular an electric power tool, having an axial flux machine according to the disclosure, in particular an axial flux motor according to the disclosure.

In the context of the disclosure, an electric machining device should be understood as being, inter alia, battery- or line-operated electric power tools for machining workpieces by means of an electrically driven application tool. In this case, the electric machining device can be in the form both of a hand-held electric power tool and of a stationary electric power tool. Typical electric power tools are, in this connection, hand drills or standing drills, screwdrivers, impact drills, hammer drills, demolition hammers, planes, angle grinders, orbital sanders, polishing machines or the like. Suitable electric machining devices are also motor-driven gardening appliances such as lawnmowers, lawn trimmers, branch saws or the like, however. Furthermore, the disclosure is applicable to axial flux machines in domestic and kitchen appliances such as washing machines, dryers, vacuum cleaners, mixers, etc.

The term axial flux machine can comprise both an axial flux motor and an axial flux generator for converting mechanical energy into electrical energy. Likewise, an axial flux machine should also be understood as being an axial flux motor which is used at least at times to recover mechanical energy and convert it into electrical energy, as may be the case for example during the electrodynamic braking of an axial flux motor.

In a development of the disclosure, it is provided that a plurality of stator teeth and a first stator yoke of the stator are formed from the composite materials. This particularly advantageously ensures a high torque density of the axial flux machine. In addition, as a result of the use of composite materials in the structure of the stator tooth, tangential and radial overhangs of the pole shoe are achieved. This has the advantage that the individual tooth windings can be embedded in the respective stator teeth, resulting in turn in a reduction in the winding heads. The additional formation of the first stator yoke from composite materials ensures a defined transfer of the magnetic flux from the stator teeth to the stator yoke. In this case, the stator teeth, formed from the composite materials, and the first stator yoke are connected permanently together by a joining process, in particular adhesively bonded together. As a result, the coil carrier can be externally wound during the joining process by applying the stator winding or the individual tooth windings to the stator teeth, such that a high filling factor of the stator winding is achievable.

In a further configuration of the axial flux machine according to the disclosure, a second stator yoke that consists of soft-magnetic iron is arranged between the first stator yoke and the stator teeth in the axial direction of the machine shaft. This stabilizes the stator under heavy mechanical load and, on account of its high permeability, ensures improved magnetic flux guidance.

To interrupt the eddy-current paths, the second stator yoke is in the form of a lamination stack with a plurality of slots, distributed around its outer circumference, for receiving the composite materials. In this case, the position of the slots is decisive more than their width. Furthermore, the second stator yoke has a plurality of annularly arranged, circular-segment-shaped cutouts for receiving the stator teeth. In this case, each slot interrupts the outer circumference of the second stator yoke as far as the respectively radially internal cutout.

Each stator tooth has a circular-segment-shaped tooth flange which engages through the circular-segment-shaped cutout in the second stator yoke, and a circular-segment-shaped carrier frame, engaging around the tooth flange, having a peripheral U-shaped profile for receiving the stator winding. The tooth flange and carrier frame are connected permanently together via a joining process, in particular adhesively bonded together.

The rotor of the axial flux machine is in the form of a laminated ring made of soft-magnetic iron. It additionally carries an alternately magnetized magnetic ring which cooperates with the stator winding of the stator in order to set the rotor into rotational movement in motor mode or to induce a voltage in the stator winding in generator mode.

BRIEF DESCRIPTION OF THE DRAWINGS

The disclosure is explained by way of example in the following text with reference to FIGS. 1 to 10, wherein identical reference signs in the figures indicate identical components with an identical function.

In the figures.

DETAILED DESCRIPTION

Figure 1:
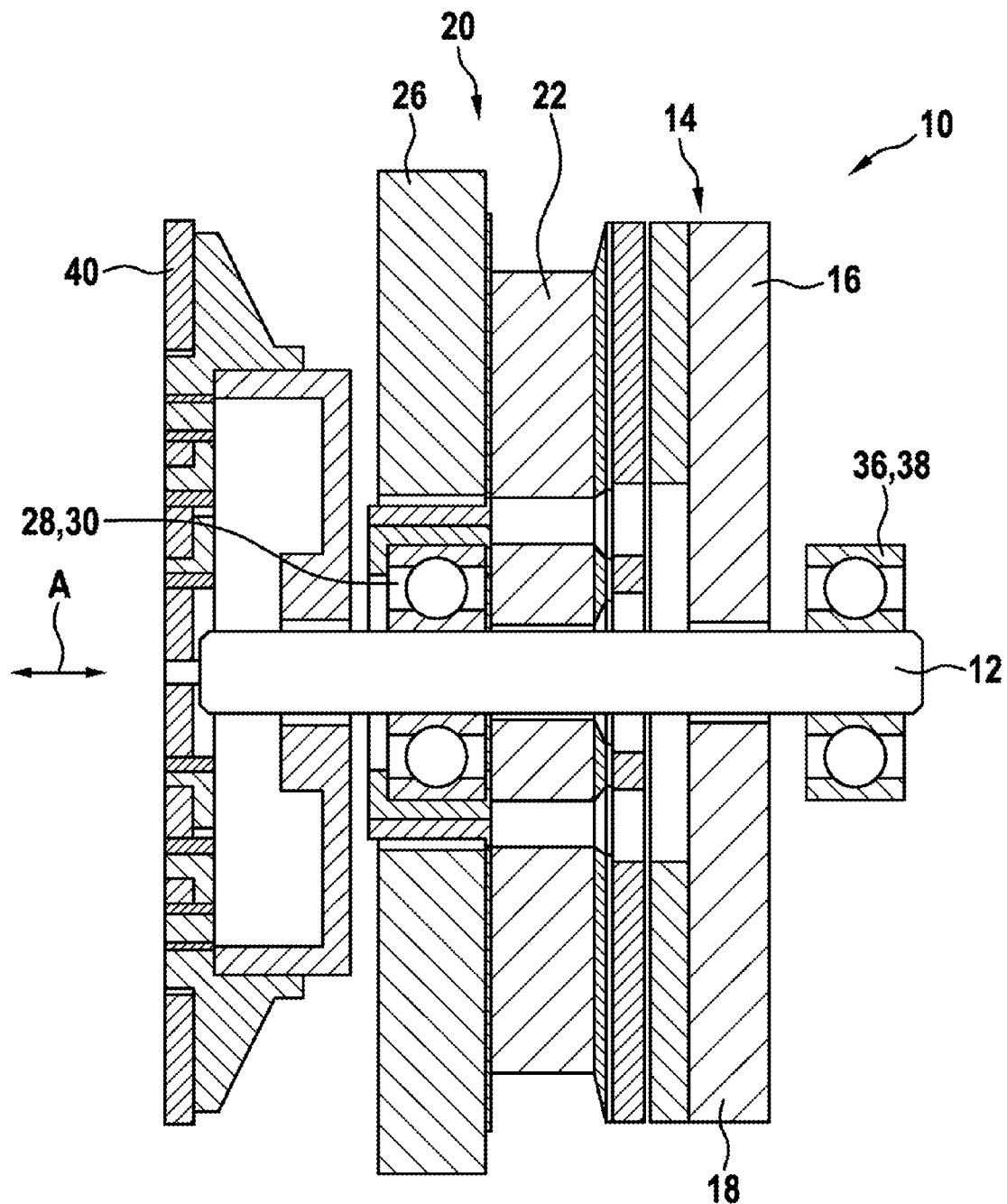
FIG. 1 shows a section through an axial flux machine according to the disclosure in the form of a single-sided axial flux motor in a first exemplary embodiment.

FIG. 1 illustrates a first exemplary embodiment of an axial flux machine 10 according to the disclosure in a section. The axial flux machine 10 can equally be in the form of an axial flux motor or of an axial flux generator. A disk-like rotor 14 is arranged on a machine shaft 12 of the axial flux machine 10 for conjoint rotation with the machine shaft 12. The rotor 14 is in the form of a laminated ring 16 made of soft-magnetic iron and carries an alternately magnetized magnetic ring 18, which will be discussed in more detail with reference to FIG. 5. Since, however, the rotor 14 is not generally exposed to an alternating field and thus the risk of eddy-current losses is relatively low, the rotor 14 can alternatively also consist of materials that are not soft magnetic, such as iron, or of a soft-magnetic steel with a low carbon content. Located next to the rotor 14 or to the magnetic ring 18 in the axial direction A of the motor shaft 12 is a likewise disk-like stator 20, which is in the form of a winding carrier 22 for at least one stator winding 24 (cf. FIG. 2) and which has a first stator yoke 26, which serves as a magnetic return path for the magnetic field resulting from the stator winding 24 and the magnetic ring 18. In relation to the stator 20 or the stator winding 24, the rotor 14 is able to be set in rotational movement via the motor shaft 12. To this end, the motor shaft 12 is rotatably mounted on one side via a first bearing 28 which is integrated in the stator yoke 26 and is in the form for example of a fixed bearing 30, and on the other side via a second bearing 36 which is received in a housing 32 of an electric machining device 34 (cf. FIG. 10) and is in the form for example of a floating bearing 38. The first and the second bearing 28, 36 are preferably in the form of ball bearings. The first bearing 28 is integrated directly into the winding carrier 22 and/or into the first stator yoke 26. Thus, it can be for example pressed in or molded in. Since in particular single-sided axial flux machines exhibit a very high tensile force in the axial direction A of the machine shaft 12 in the air gap between the rotor 14 and stator 20, this can be absorbed by the first bearing 28, in the form of a fixed bearing 30, in the first stator yoke 26. Thus, it is not necessary for the axial force to be absorbed by the housing 32 of the electric machining device 34 and/or by a housing of the axial flux machine (cf. FIGS. 6 and 7).

To cool the axial flux machine 10, a fan wheel 40 is arranged for conjoint rotation on the machine shaft 12, said fan wheel 40 transporting cooling air through the axial flux machine 10. To this end, the fan wheel 40 draws the cooling air in preferably radially, in order then to convey it axially through the axial flux machine 10.

Figure 2:
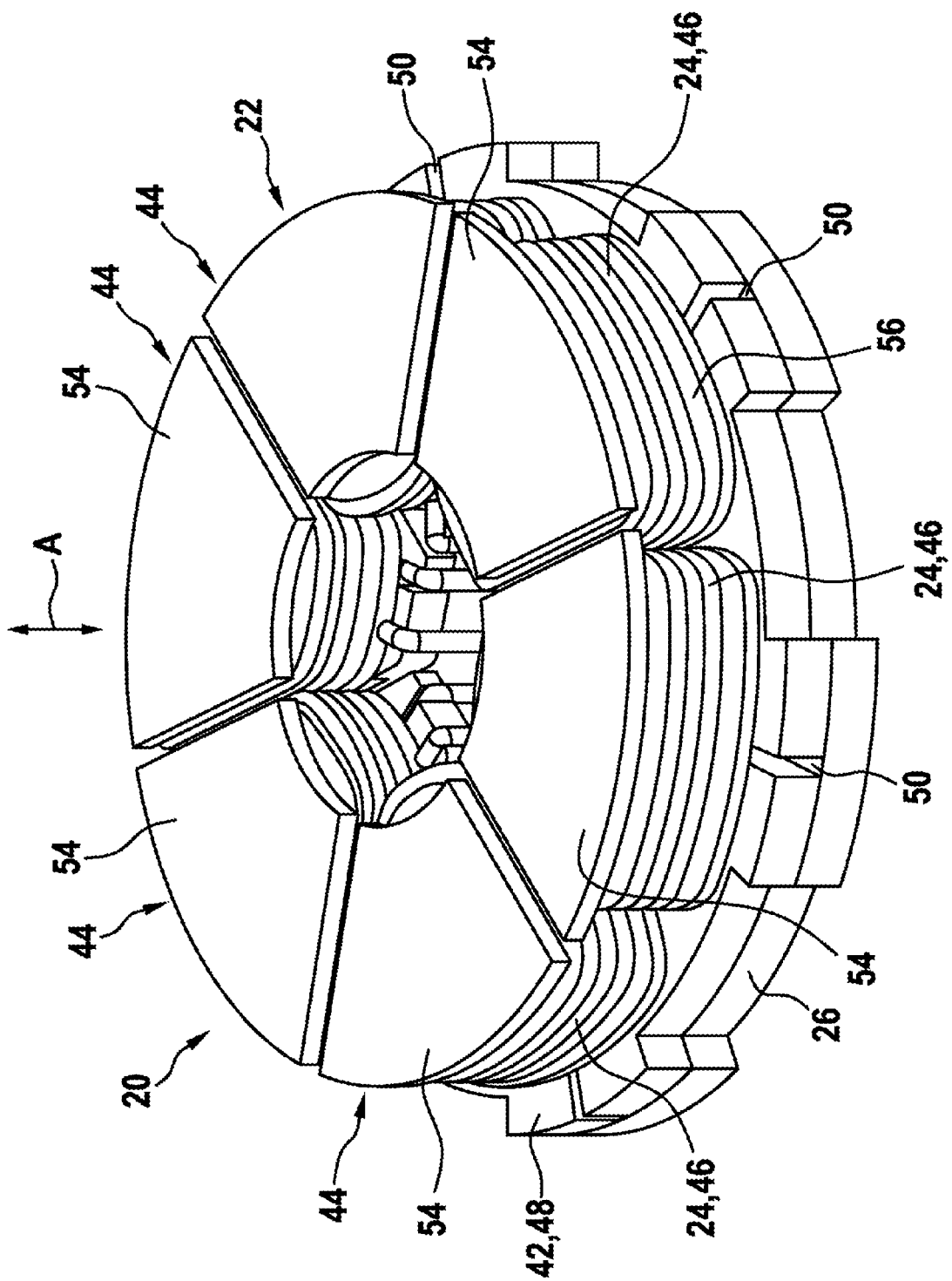
FIG. 2 shows a schematic view of a further exemplary embodiment of a stator of the axial flux machine according to the disclosure.

FIG. 2 shows a schematic view of a further exemplary embodiment of the disk-like stator 20 of the axial flux machine 10 according to the disclosure. The stator 20 comprises substantially the first stator yoke 26, a second stator yoke 42, arranged next to the latter in the axial direction A of the machine shaft 12, and the winding carrier 22, arranged next to the second stator yoke 42 in the axial direction A of the machine shaft 12. The winding carrier 22 consists substantially of a plurality of, in particular six, stator teeth 44 carrying the stator winding 24, wherein each stator tooth 44 is assigned an individual tooth winding 46 of the stator winding 24. The individual tooth windings 46 are connected electrically together in a triangle parallel circuit 48 with reference to FIG. 9a.

The stator teeth 44 and the first stator yoke 26 of the stator 20 are formed from composite materials (soft magnetic composites—SMC) and connected permanently together by a joining process, in particular adhesively bonded together. SMC materials consist of high-purity iron powder with a special surface coating on each individual particle. This electrically insulating surface ensures high electrical resistance even after pressing and the heat treatment, this in turn having the effect that eddy-current losses are minimized or avoided. Particularly advantageously compared with axial flux machines of the prior art, an axial flux machine that is extremely resistant to mechanical loads and at the same time very powerful and efficient, or a high-torque axial flux motor, can thus be provided. The joining of the stator teeth 44 to the first stator yoke 26 allows external winding of the winding carrier 22 through the application of the stator winding 24 or of the individual tooth windings 46 to the stator teeth 44 during the joining process. In this way, a high filling factor of the stator winding 24 is achievable.

In contrast to the first stator yoke 26, the second stator yoke 42 of the rotor 20 consists of soft-magnetic iron and is in the form of a lamination stack 48 (cf. FIG. 3) with a plurality of, in particular six, slots 50, distributed around its outer circumference, for receiving the composite materials. The number of slots 50 corresponds to the number of stator teeth 44. The second stator yoke 42 thus stabilizes the stator 20 under heavy mechanical load and, on account of its high permeability, ensures improved magnetic flux guidance. The slots in the lamination stack 48 not only cause the composite materials to be received better and thus bring about greater stability of the stator 20, but also ensure optimized guidance of the eddy currents caused substantially by the stator winding 24.

Figure 3:
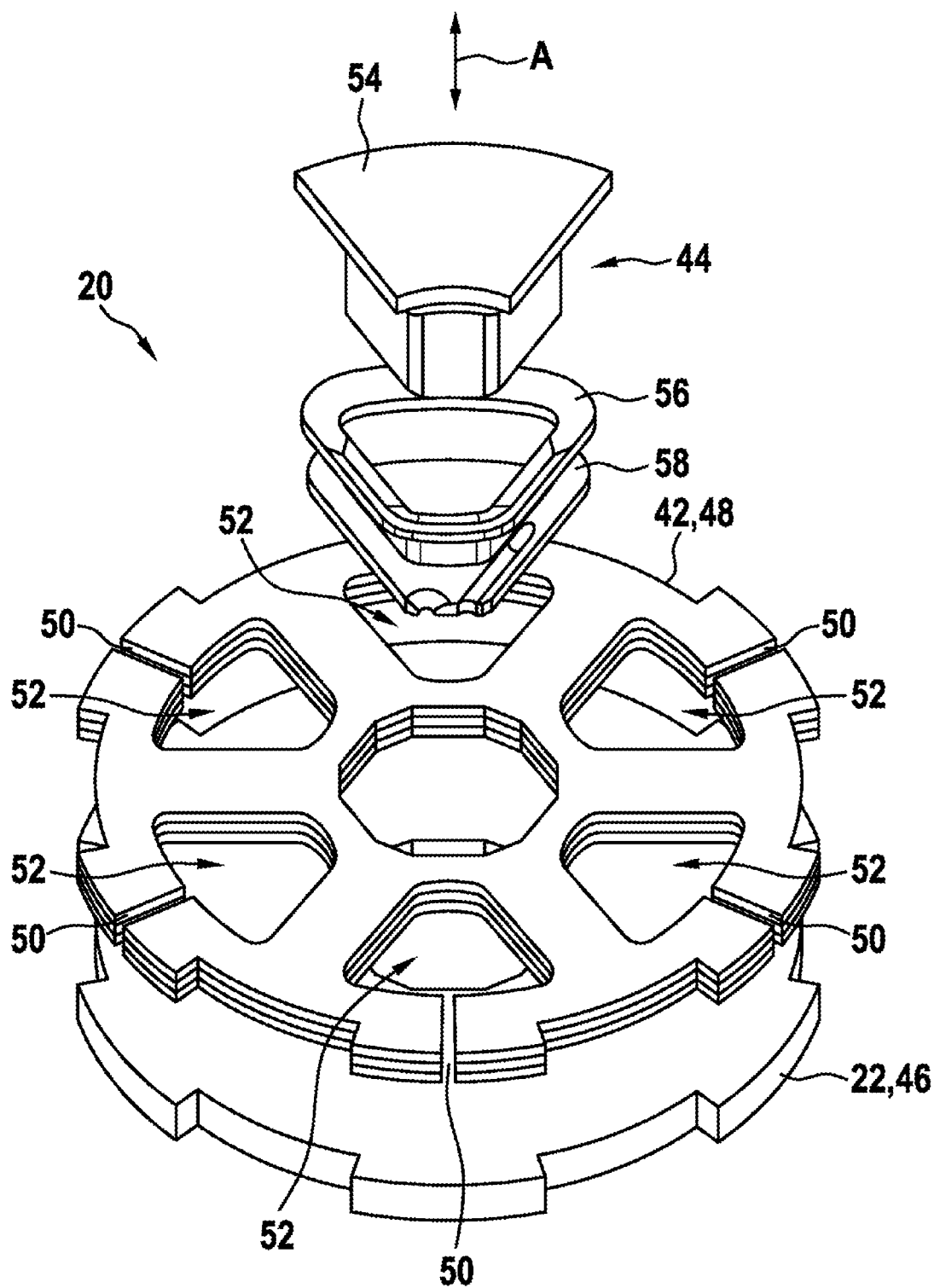
FIG. 3 shows an exploded drawing of the stator from FIG. 2 in a schematic view without a stator winding.

According to FIG. 3, the second stator yoke 42 has, to receive the stator teeth 44, annularly arranged, circular-segment-shaped cutouts 52, wherein each slot 50 interrupts the outer circumference of the second stator yoke 42 as far as the respectively radially internal cutout 52. Each stator tooth 44 is formed by a circular-segment-shaped tooth flange 54, which engages through the circular-segment-shaped cutout 52 in the second stator yoke 42, and a circular-segment-shaped carried frame 56, engaging around the tooth flange 54, with a peripheral U-shaped profile 58 for receiving the stator winding 24 or the individual tooth windings 46. The tooth flange 54 and carrier frame 56 are connected permanently together via a joining process, in particular adhesively bonded together.

Figure 4:
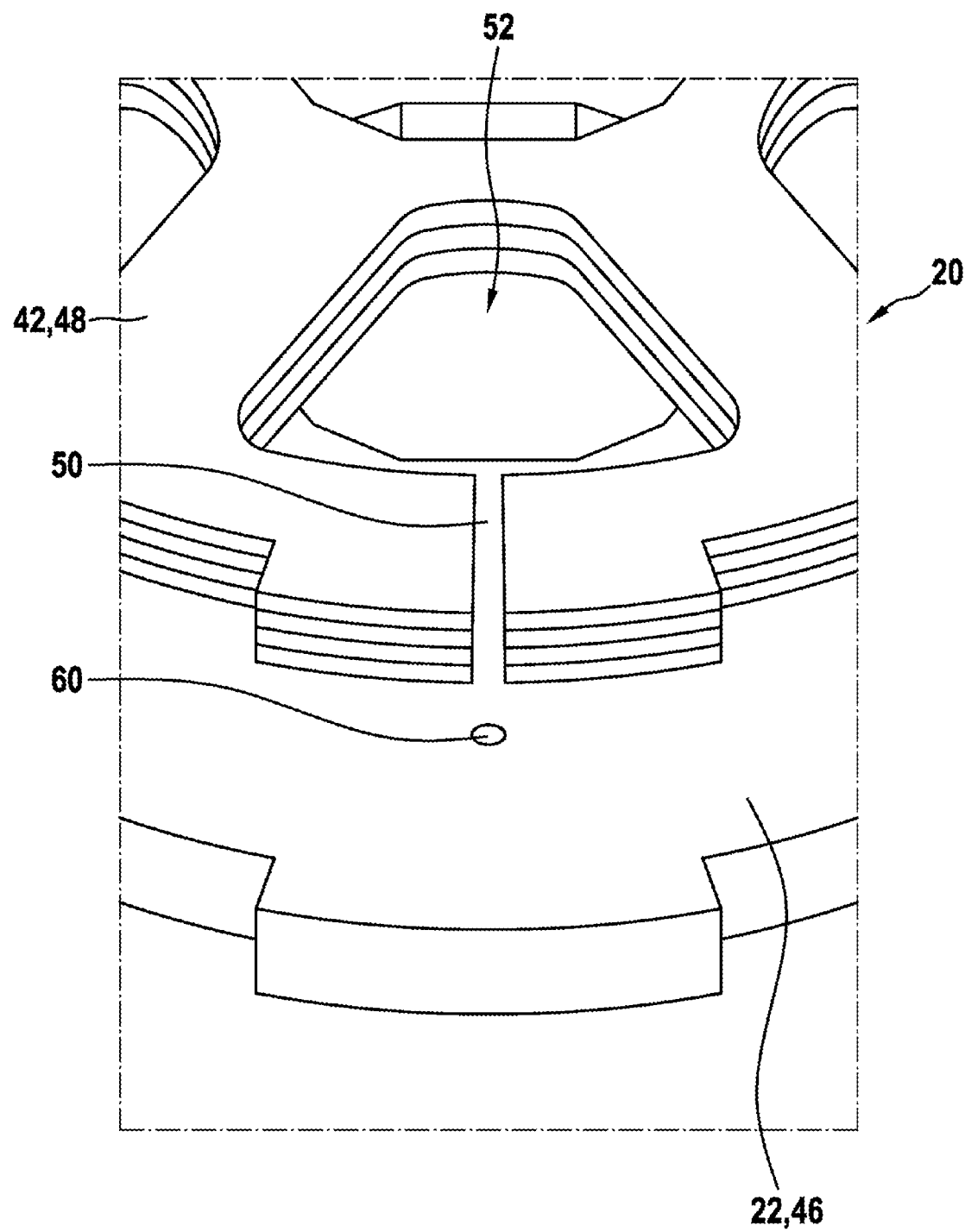
FIG. 4 shows a schematic view of a detail of the stator according to the disclosure in a further exemplary embodiment.

FIG. 4 shows a schematic view of a detail of the stator 20 according to the disclosure in a further exemplary embodiment. In this case, the stator teeth 44, or the tooth flanges 54 thereof (cf. FIG. 3), are passed through the cutouts 52 in the second stator yoke 42 and permanently connected to the first stator yoke 26 by laser welding. A bore 60 is provided in the first stator yoke 26 in each case approximately in the middle of each face, bearing on the first stator yoke 26, of a stator tooth 44, said bore 60 being used to connect the stator tooth 44 to the first stator yoke 26 by means of the laser welding.

To permanently connect the first stator yoke 26 and the respective stator tooth 44, a weld seam extends around the entire circumference of the bore 60. Alternatively, however, it may also be provided that the weld seam extends only in spots around the circumference of the bore 60. The weld in the middle of each stator tooth 44 has only a small influence on the guidance of the magnetic flux and high plane parallelism of the stator teeth 44 with respect to the radial air gap between them is achievable. As a result of the avoidance of an adhesive bond, it is possible to effectively avoid an adhesive gap between the stator tooth 44 and the first stator yoke 26, and no fixing of the stator tooth 44 and the first stator yoke 26 is necessary during the curing of the adhesive bond. With reference to FIG. 1, it is alternatively also conceivable to dispense with the second stator yoke 42 and instead to connect the first stator yoke 26, in the form of a laminated ring 16 made of soft-magnetic iron, directly to the stator teeth 44 that consist of composite materials, in particular to weld it thereto by means of the bore 60 in the first stator yoke 42.

Figure 5:
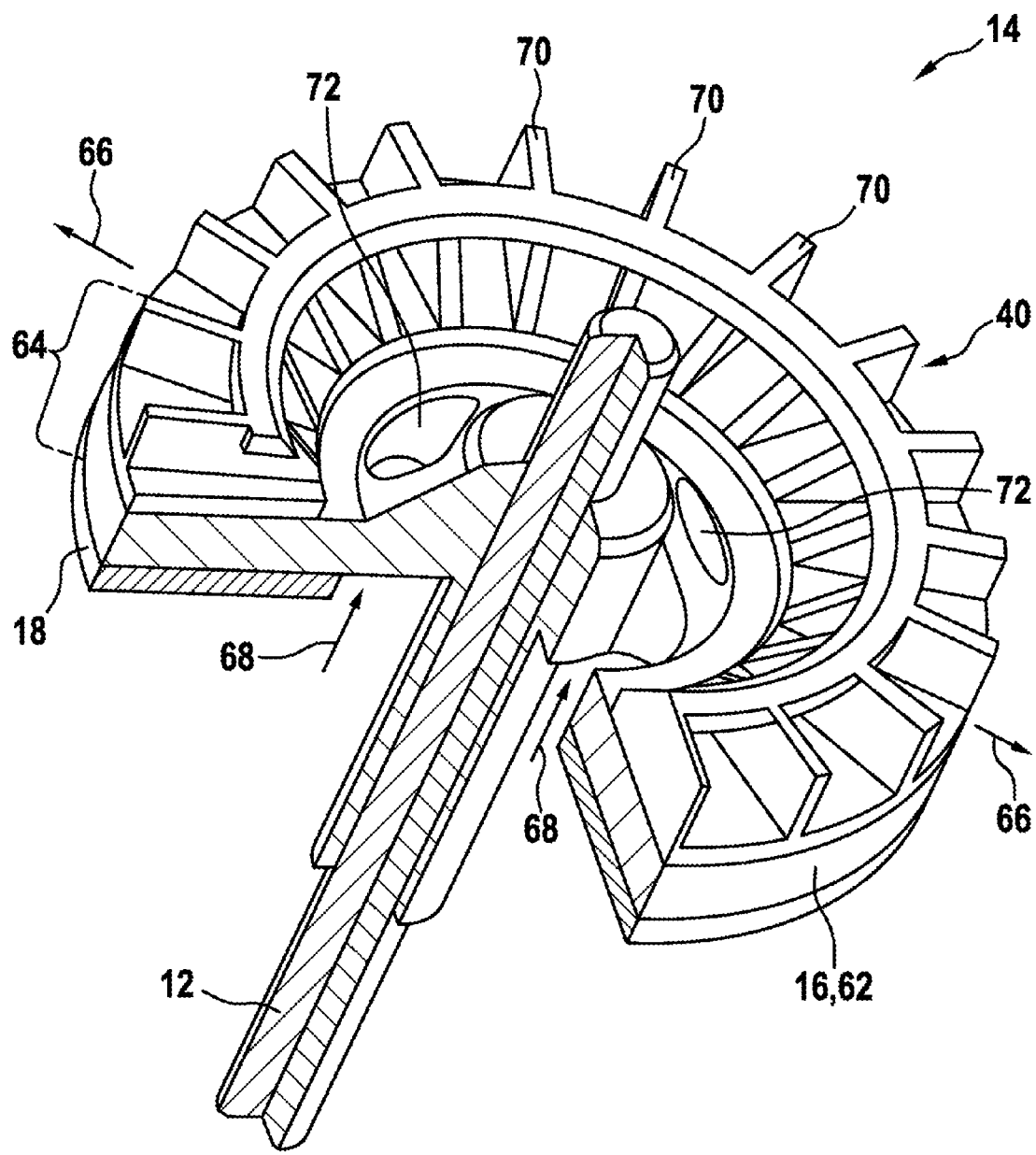
FIG. 5 shows a schematic sectional view of a rotor of the axial flux machine according to the disclosure.

FIG. 5 illustrates a schematic view of the rotor 14 of the axial flux machine 10 according to the disclosure in section. The rotor 14 is in the form of a laminated ring 16 made of soft-magnetic iron. It additionally carries an alternately polarized magnetic ring 18 which cooperates with the stator winding 24 of the stator 20 in order to set the rotor 14 in rotational movement in motor mode or to induce a voltage in the stator winding 24 in generator mode. The magnets (not shown in more detail) of the magnetic ring 18 are configured in a circular-segment-shaped manner such that their faces are largely congruent with the circular-segment-shaped stator teeth 44 in order to achieve an optimal magnetic flux in conjunction with a high torque. Rather than an alternately polarized magnetic ring 18, a ring having embedded individual magnets is alternatively also conceivable. As already mentioned, the rotor 14 is generally not exposed to an alternating field and so no or only very low eddy-current losses arise here. Therefore, the rotor 14 of the axial flux machine 10 can alternatively also consist of a material that is not soft magnetic.

In a preferred configuration of the disclosure, the laminated ring 16 of the rotor 14 is in the form of a rotor yoke 62 which is either permanently connected to a bidirectional fan 40 by a joining process, in particular adhesively bonded thereto, or serves itself as a bidirectional fan 64. In this case, the bidirectional fan 40, 64 has at least a radial air-flow direction 66 and an axial air-flow direction 68 for cooling the axial flux machine 10, in particular for cooling the stator 20 or the stator winding 24 and the rotor 14. The radial air-flow direction 66 is achieved in this case substantially by a plurality of radial airfoils 70 arranged in a circle in the outer radius region of the bidirectional fan 40, 64, and the axial air-flow direction 68 is achieved by a plurality of axial openings 72 arranged in the inner radius region of the rotor yoke 62.

Figure 6:
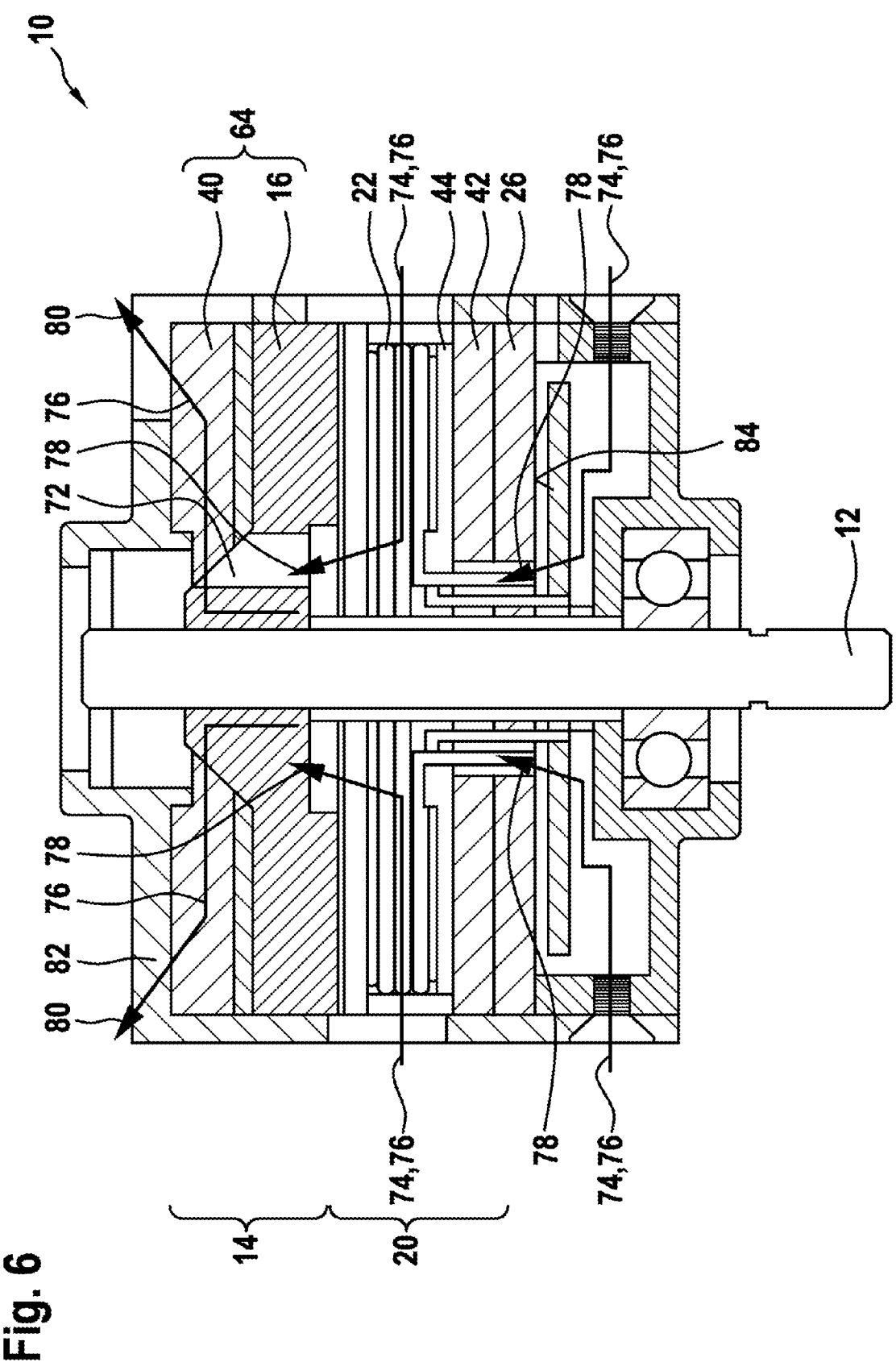
FIG. 6 shows a schematic view of a housing of the axial flux machine according to the disclosure.

Thus, the bidirectional fan 40, 64, with reference to FIG. 6, effects a radial intake 74 of an air flow 76 with an axial through-flow 78 through the stator 20 and the rotor 14 of the axial flux machine 10 and a radial escape 80 of the heated air flow 76 from a housing 82 of the axial flux machine 10. The radial intake 74 of the air flow 76 takes place both through the air gaps between the stator teeth 44 (cf. FIG. 2) and in the region of the first stator yoke 26 of the stator 20, in particular on a distal end side 84, as seen from the rotor 14, of the first stator yoke 26.

Figure 7:
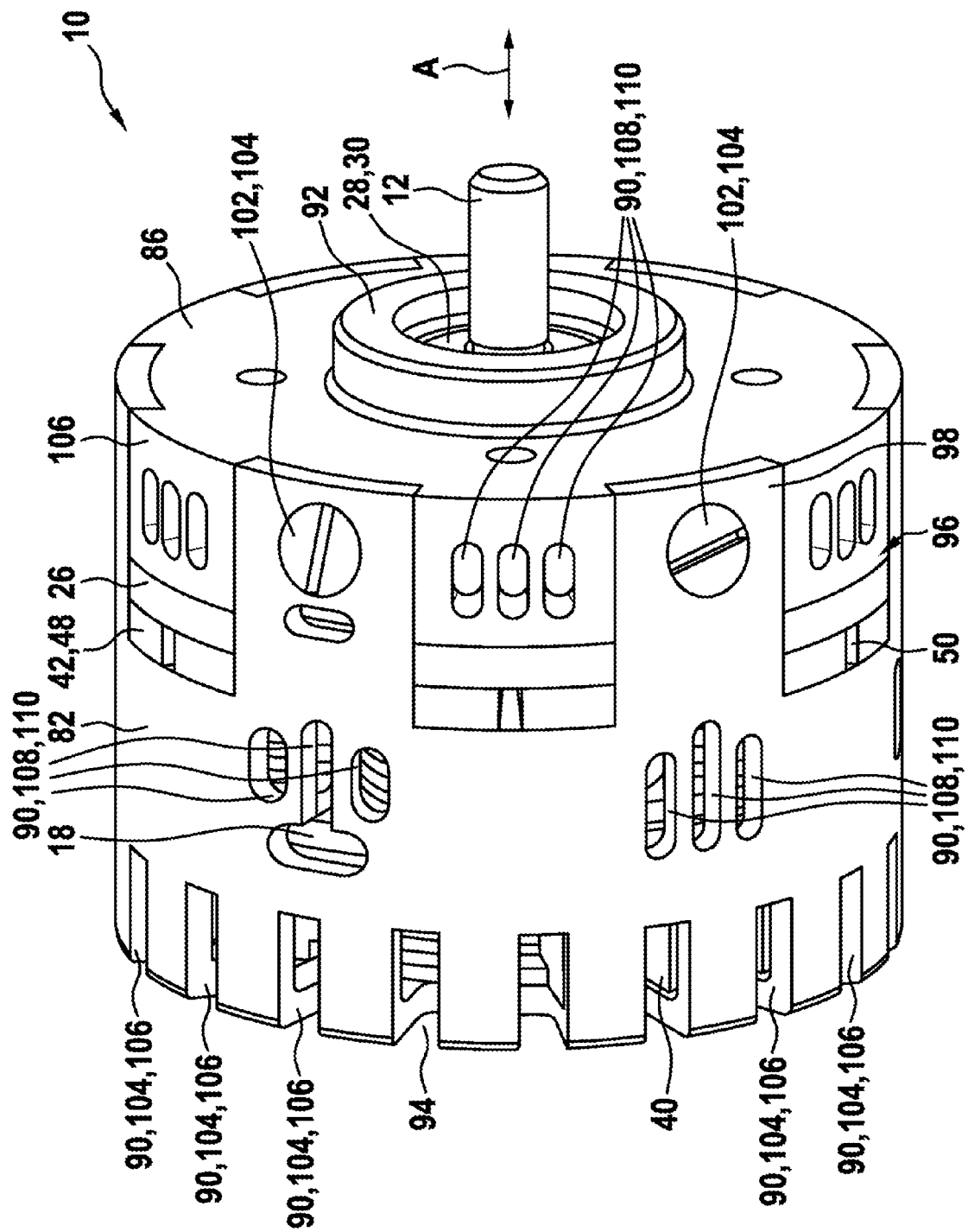
FIG. 7 shows a further schematic view of the empty housing of the axial flux machine according to the disclosure from FIG. 6.

In FIG. 7, the axial flux machine 10 is illustrated with its housing 82 together with a cover 86 closing the latter. FIG.

Figure 8:
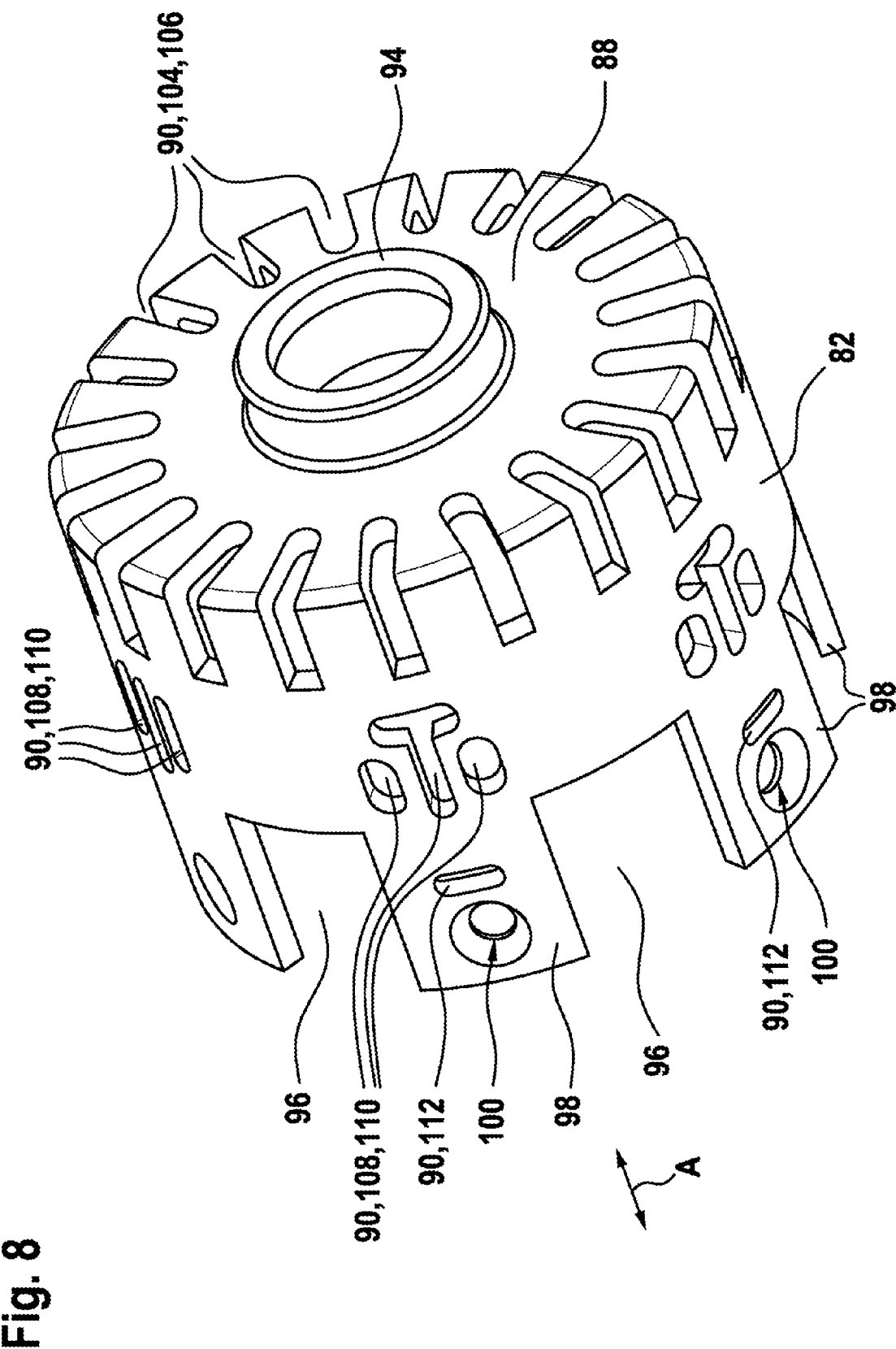
FIG. 8 shows a schematic view of a further exemplary embodiment of the cooling air guidance within the axial flux machine according to the disclosure in a section.

8 shows the housing 82 without an axial flux machine 10 and a cover 86. The housing 82 is open on one side to receive the cover 86 and has, on the opposite side, a substantially closed end side 88 (cf. FIG. 8). The cover 86 closes the housing 82 and thus connects the stator 20 and the rotor 14 of the axial flux machine 10 in a force-fitting manner. The expression "substantially closed" should be understood in this context as meaning that the end side 88 may have a plurality of openings 90 for example for cooling, as cable passages and/or as a bushing for the machine shaft 12, but alternatively also that the end side 88 is completely closed. The housing 82 is cylindrical and fixes the stator 20 such that a defined air gap arises between the rotor 14 or its magnetic ring 18 and the stator 20 or its winding carrier 22. To reduce or avoid eddy-current losses, the housing 82 is produced from a magnetically insulating material with as low permeability as possible, for example plastic (PA66). The cover 86 can also be formed in a corresponding way.

While the first bearing 28 in the form of a fixed bearing 30 is fixed in a bearing flange 92 of the cover 86, said first bearing 28 supporting the machine shaft 12 in an immovable manner, the substantially closed end side 86 of the housing 82 has, in a further bearing flange 94, the second bearing 36, in the form of a floating bearing 38, for movably supporting the machine shaft 12. In this way, the housing 82 can be pushed on very easily after the assembly of the axial flux machine 10 and removed again for any servicing work.

On its open side, a plurality of cutouts 96 and tabs 98 for receiving and fixing the stator 20 are alternately arranged in a manner distributed around the circumference of the housing 82. In this case, radial protrusions (cf. FIGS. 2 and 3) distributed around the circumference of the first and the second stator yoke 26, 42 of the stator 20 engage in the respective cutouts 96 in the housing 82. In a corresponding manner, the cover 86 also contains radial protrusions in the form of tabs 106, which engage in the cutouts 96 in the housing 82. In this way, the high axial forces of the axial flux machine 10 can be discharged in the direction of the cover 86. Provided in each tab 98 of the housing 82 is at least one bore 100 for fixing the cover 86 and accordingly also the stator 20 by means of corresponding fastening means 102, in particular screws 104. The fastening means 102 transmit the axial force of the axial flux machine 10 to the housing 82 and are thus subject to shear stress.

The openings 90 in the substantially closed end side 88 of the housing 82 are in the form of radially and/or axially acting ventilation openings 104, in particular of air-outlet openings 106, for cooling the axial flux machine 10 (cf. also FIG. 6). In addition, the housing 82 has, approximately in the middle between the substantially closed end side 88 and the open side that is opposite the latter in the axial direction A, a plurality of radially acting ventilation openings 108, in particular air-inlet openings 110, distributed around the circumference. In addition to the openings 90 for cooling the axial flux machine 10, further openings 90 are provided in particular in the tabs 98 of the housing 82, said further openings 90 being able to serve as feedthroughs 112 for sensor lines or the like.

Figure 9A:
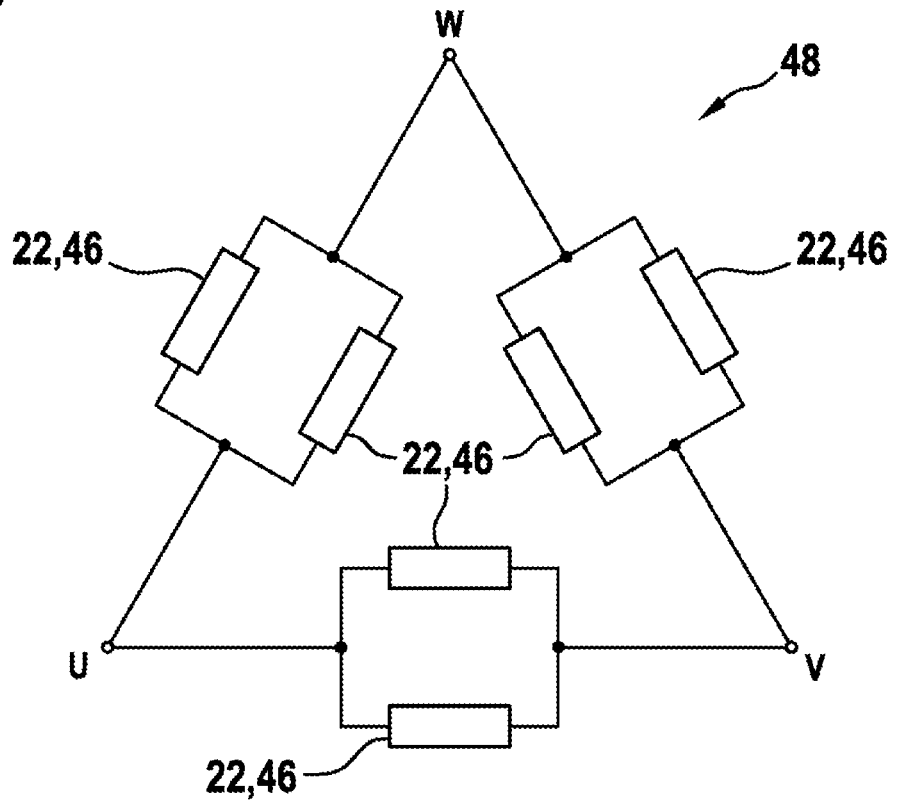
FIG. 9 shows two exemplary embodiments of triangle parallel circuits of the individual tooth windings of a stator winding of the axial flux machine according to the disclosure.
Figure 9B:
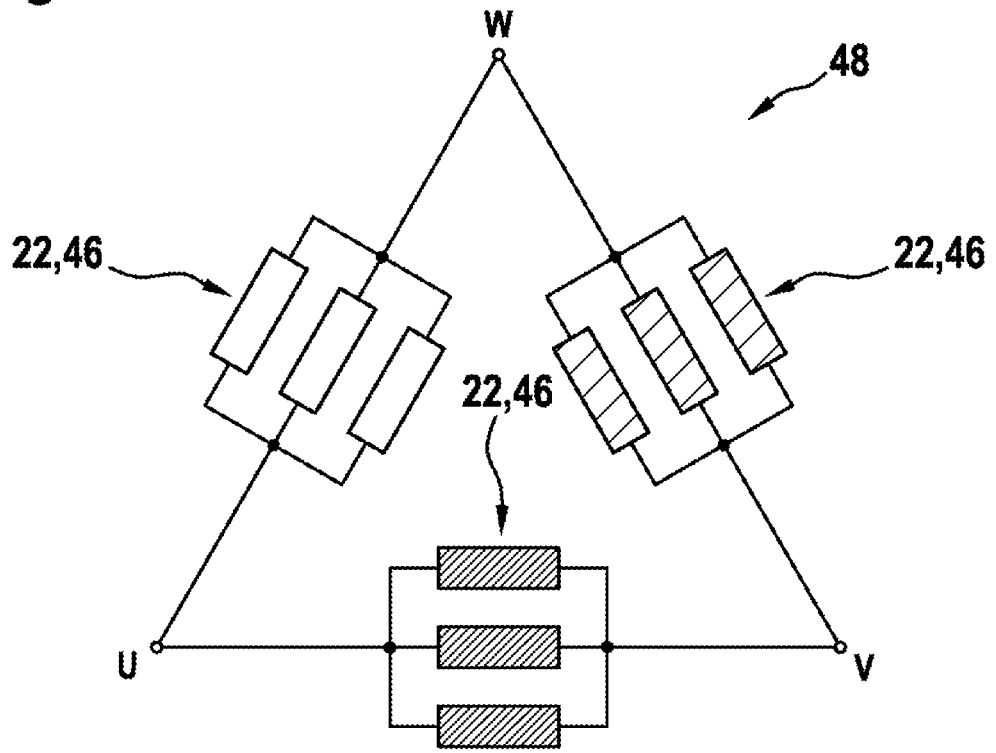

FIG. 9a illustrates a circuit diagram of the stator winding 22 as a triangle parallel circuit 48 of the six individual tooth windings 46 of the stator teeth 44 (cf. FIG. 2). Per phase, in each case two individual tooth windings 46 are connected in parallel between the connection points U and V, V and W and W and U, respectively. The triangle circuit as such has the effect that the entire supply voltage drops at each individual tooth winding 46. This necessitates an increase in the number of windings of the individual tooth windings 46 in order to realize a specifically required speed in motor mode and to realize a specifically required energy yield in generator mode. As a result of the additional parallel circuit, the winding wire diameter can particularly advantageously be increased and thus the resultant internal resistance can be reduced. The triangle parallel circuit 48 thus makes it possible to reduce the internal resistance of the axial flux machine 10 compared with a conventional star circuit, resulting in a considerable increase in the performance of the axial flux machine 10 compared with previous solutions. FIG. 9b shows an alternative configuration of the triangle parallel circuit 48 for a total of nine individual tooth windings 46 of the stator winding 22.

Figure 10:
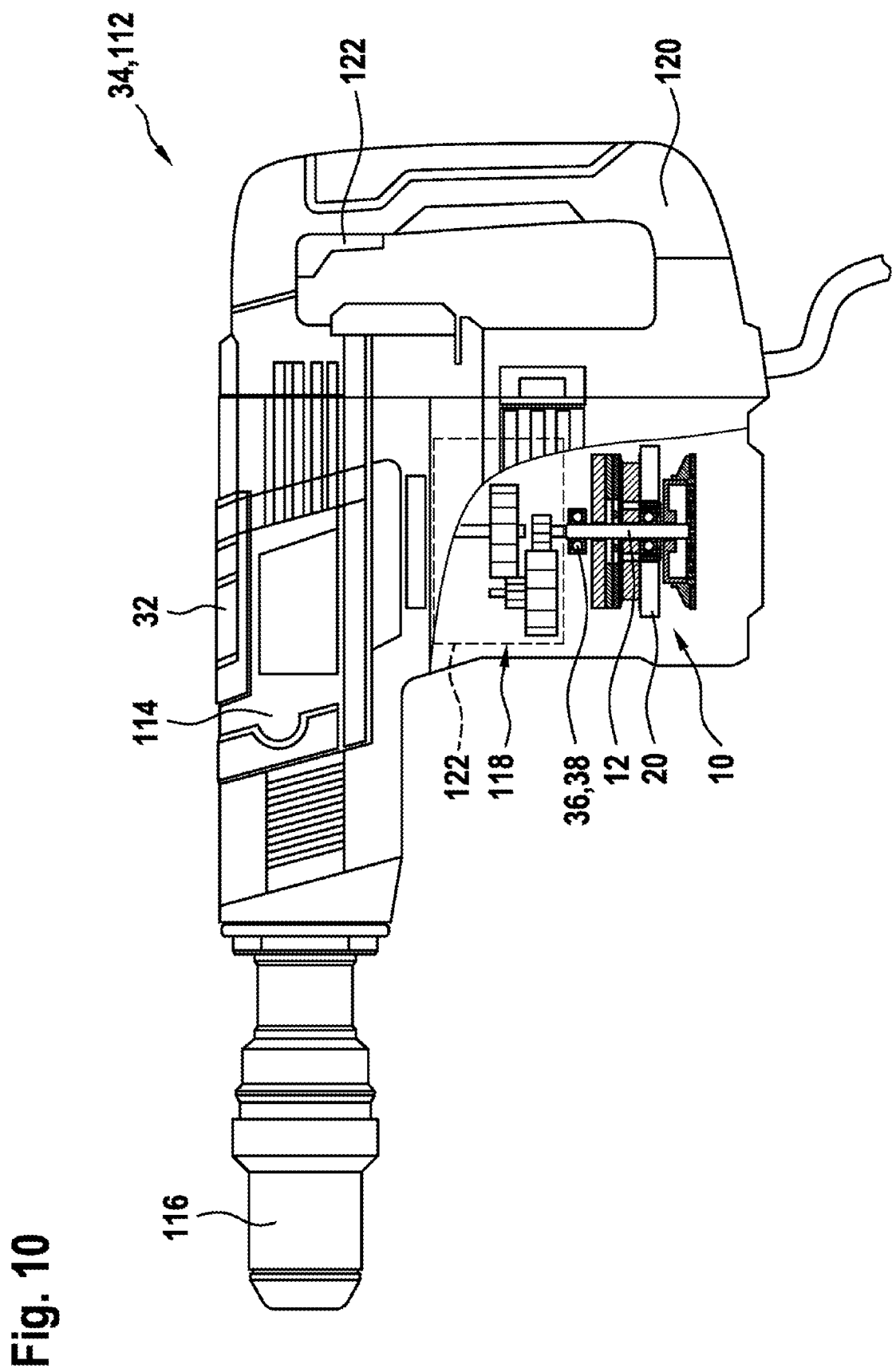
FIG. 10 shows an electric machining device, in particular an electric power tool in the form of a hammer drill, having an axial flux machine according to the disclosure.

FIG. 10 shows an exemplary embodiment of an electric machining device 34 with the axial flux machine 10 according to the disclosure according to FIG. 1. The electric machining device 34 is in the form of an electric power tool 112 in the form of a line-operated hammer drill having an impact mechanism 114 driven by an electric motor, said impact mechanism 114 setting a chuck 116 for an application tool (not shown) in rotational and/or percussive movement. The precise configuration of the hammer drill will not be discussed in more detail here since it is well known to those skilled in the art. The electric machining device can also be understood to be any other battery- or line-operated electric power tool 112 for machining workpieces by means of an electrically driven application tool. The electric machining tool can be in the form both of a hand-held electric power tool and of a stationary electric power tool. Typical electric power tools are, in this connection, hand drills or standing drills, screwdrivers, impact drills, hammer drills, demolition hammers, planes, angle grinders, orbital sanders, polishing machines or the like. Suitable electric machining devices are also motor-driven gardening appliances such as lawnmowers, lawn trimmers, branch saws or the like, however. Furthermore, the disclosure is applicable to axial flux machines in domestic and kitchen appliances such as washing machines, dryers, vacuum cleaners, mixers, etc.

The axial flux machine 10, operating as an axial flux motor, of the electric power tool 112 drives the impact mechanism 114 via a transmission 118 in a known way by means of its machine shaft 12. The axial flux machine 10 is controlled in this case via a main switch 122 arranged in a D handle 120 of the electric power tool 112, said main switch 122 cooperating with electronics (not shown) to energize the stator winding 22 connected into the triangle parallel circuit 48. The stator 20 of the axial flux machine 10 is accommodated directly in the housing 32 of the electric power tool 112. To this end, the stator 20 and the housing 32 are connected permanently together by a joining process, in particular adhesively bonded together. Alternatively, however, the stator 20 can also be connected permanently to the housing by a form-fit, in particular pressed together therewith. Furthermore, it may be provided that the housing 32 or a transmission housing 122 of the electric power tool 112 accommodates the second bearing 36, in particular in the form of a floating bearing 38, connected to the machine shaft 12 of the axial flux machine 10. Rather than the axial flux machine 10 shown in FIG. 1, the electric power tool 112 or the electric machining device 34 can also be equipped with an axial flux machine 10 according to FIGS. 6 to 8 without limiting the disclosure.

Lastly, it should also be noted that the disclosure is not limited to the exemplary embodiments shown in FIGS. 1 to 10 or to the specified number of stator teeth, individual tooth windings and magnets of the magnetic ring.

The invention claimed is:

1. An axial flux machine for an electric machining device, comprising:
   a machine shaft;
   a disk-like stator; and
   a disk-like rotor arranged next to the stator in an axial direction of the machine shaft,
   wherein the stator includes a winding carrier for at least one stator winding, and the rotor is connected to the machine shaft for conjoint rotation and is configured to rotationally move relative to the stator,
   wherein the stator comprises a combination of composite materials and soft-magnetic iron,
   wherein the stator includes a plurality of stator teeth and a first stator yoke that are formed from the composite materials, and
   wherein the stator further comprises a second stator yoke that consists of soft-magnetic iron and is arranged between the first stator yoke and the plurality of stator teeth in the axial direction of the machine shaft.

2. The axial flux machine as claimed in claim 1, wherein the plurality of stator teeth are formed from the composite materials and are connected permanently to the first stator yoke by a joining process.

3. The axial flux machine as claimed in claim 1, wherein the second stator yoke is formed as a lamination stack defining a plurality of slots, which are distributed around an outer circumference of the lamination stack, configured to receive the composite materials.

4. The axial flux machine as claimed in claim 2, wherein the plurality of stator teeth are permanently connected to the first stator yoke by an adhesive bond.

5. The axial flux machine as claimed in claim 3, wherein the second stator yoke defines annularly arranged, circular-segment-shaped cutouts in which the plurality of stator teeth are received.

6. The axial flux machine as claimed in claim 5, wherein each slot of the plurality of slots interrupts the outer circumference of the lamination stack as far as a respectively one of the circular-segment-shaped cutouts.

7. The axial flux machine as claimed in claim 5, wherein each stator tooth of the plurality of stator teeth comprises:
   a circular-segment-shaped tooth flange which engages through an associated one of the circular-segment-shaped cutouts in the second stator yoke; and
   a circular-segment-shaped carrier frame that engages around the tooth flange and has a peripheral U-shaped profile in which the stator winding is received.

8. The axial flux machine as claimed in claim 1, wherein the rotor is formed as a laminated ring of soft-magnetic iron.

9. The axial flux machine as claimed in claim 1, wherein the axial flux machine is a single-sided axial flux motor.

10. The axial flux machine as claimed in claim 1, wherein the machine shaft is a motor shaft.

11. The axial flux machine as claimed in claim 1, wherein the composite materials of the stator are fiber-plastic composites.

12. The axial flux machine as claimed in claim 1, wherein the stator consists of the combination of composite materials and soft-magnetic iron.

13. An electric machining device comprising:
   an axial flux machine comprising: a machine shaft;
      a disk-like stator; and
      a disk-like rotor arranged next to the stator in an axial direction of the machine shaft,
   wherein the stator includes a winding carrier for at least one stator winding, and the rotor is connected to the machine shaft for conjoint rotation and is configured to rotationally move relative to the stator,
   wherein the stator comprises a combination of composite materials and soft-magnetic iron,
   wherein the stator includes a plurality of stator teeth and a first stator yoke that are formed from the composite materials, and
   wherein the stator further comprises a second stator yoke that consists of soft-magnetic iron and is arranged between the first stator yoke and the plurality of stator teeth in the axial direction of the machine shaft.

14. The electric machining device as claimed in claim 13, wherein the electric machining device is an electric power tool.

* * * * *

UNITED STATES PATENT AND TRADEMARK OFFICE
CERTIFICATE OF CORRECTION

PATENT NO. : 12,062,944 B2
APPLICATION NO. : 17/754576
DATED : August 13, 2024
INVENTOR(S) : Echle et al.

Page 1 of 1

It is certified that error appears in the above-identified patent and that said Letters Patent is hereby corrected as shown below:

On the Title Page

On Page 2, Item (56) under heading "References Cited" and subheading "FOREIGN PATENT DOCUMENTS", in Line 3, "EP B 331 140 A1" should read --EP 3 331 140 A1--.

Signed and Sealed this
Eighteenth Day of March, 2025

Coke Morgan Stewart
*Acting Director of the United States Patent and Trademark Office*